United States Patent
Hosé

[11] Patent Number: 5,964,651
[45] Date of Patent: Oct. 12, 1999

[54] APPARATUS FOR POLISHING PLANAR SUBSTRATES THROUGH ROTATING PLATES

[75] Inventor: John S. Hosé, Versailles, Ky.

[73] Assignee: HMT Technology Corporation, Fremont, Calif.

[21] Appl. No.: 08/955,868

[22] Filed: Oct. 28, 1997

Related U.S. Application Data

[60] Provisional application No. 60/029,034, Oct. 28, 1996.

[51] Int. Cl.⁶ ....................................................... B24B 7/17
[52] U.S. Cl. .......................... 451/262; 451/268; 451/269; 451/291; 451/342
[58] Field of Search .................................. 451/262, 263, 451/264, 265, 266, 267, 268, 269, 291, 340, 342, 343, 360

[56] References Cited

U.S. PATENT DOCUMENTS

| | | |
|---|---|---|
| 1,634,745 | 7/1927 | Fraser .................................... 451/268 X |
| 2,418,770 | 4/1947 | Holister et al. .......................... 451/269 |
| 3,225,492 | 12/1965 | Day et al. ............................ 451/264 X |
| 3,537,214 | 11/1970 | Ford ......................................... 451/264 |
| 4,370,835 | 2/1983 | Von Schneidemesser et sl. 451/262 X |
| 5,364,655 | 11/1994 | Nakamura et al. . |
| 5,647,789 | 7/1997 | Kitta et al. . |
| 5,782,678 | 7/1998 | Cesna et al. ............................ 451/269 |

FOREIGN PATENT DOCUMENTS

| | | |
|---|---|---|
| 07130687 | 5/1995 | Japan . |
| 07156061 | 6/1995 | Japan . |

*Primary Examiner*—Timothy V. Eley
*Attorney, Agent, or Firm*—LeeAnn Gorthey; Dehlinger & Associates

[57] ABSTRACT

An apparatus for polishing one or more planar substrates, such as magnetic disks, between rotating polishing plates is described. The apparatus is designed to optimize uniformity and flatness of the substrates by maintaining a substantially constant parallel and coaxial alignment between the rotating polishing plates.

14 Claims, 5 Drawing Sheets

APPARATUS FOR POLISHING PLANAR SUBSTRATES THROUGH ROTATING PLATES

This application claims priority to Provisional U.S. Patent Application having Ser. No. 60/029,034, filed Oct. 28, 1996, which is hereby incorporated by reference.

FIELD OF THE INVENTION

The present invention relates to an apparatus for polishing one or more planar substrates, such as magnetic disks. The apparatus is designed to optimize uniformity and flatness of the polished substrates by maintaining a substantially constant parallel and coaxial alignment between rotating polishing plates.

BACKGROUND OF THE INVENTION

Polishing of materials to a high degree of smoothness is required in various industrial processes, including the manufacture of silicon semiconductor components or disks to be coated with magnetic storage media for the digital storage of information. Over the past several years, a significant increase in recording density in such thin-film media magnetic recording disks has been achieved, and there is a continuing effort to increase recording density further. High density storage capacity requires a thin, even magnetic coating and thus a minimal amount of topographical irregularity on the disk surface.

Another property important to achieving high recording density is low flying height, that is, a close proximity of the read/write heads to the disk surface. Such proximity decreases overlap of voltage signals in adjacent magnetic domains in the disk, thus permitting an increase in recording density and optimum read-write performance. To reduce flying height, and to improve wear resistance, it is desirable for the surface of the disk to be as smooth as possible, thus preventing contact of the disk surface with read/write heads during use.

A widely used type of polishing apparatus is that in which the substrate is placed between two rotating plates. For even polishing, a parallel, coaxial alignment of the plates should be maintained during operation. A persistent problem encountered in the use of such machines is oscillation of the polishing plates during operation. Such oscillation is typically caused by misalignment in plate supporting components or uneven pressure applied by drive mechanisms. In particular, side-to-side (radial) movement of one plate relative to the other produces both radial and angular misalignment, which results in uneven side-to-side polishing and also reduces the life of the polishing surfaces. If such misalignment is extreme or persistent, the machine must be readjusted, leading to downtime and losses in productivity.

It is therefore desirable to provide a polishing apparatus in which the polishing plates are maintained, preferably over an extended period of time, in substantially constant parallel and coaxial alignment. Ideally, any necessary correction of misalignment in the apparatus is isolated from the polishing plates.

SUMMARY OF THE INVENTION

The invention provides a polishing apparatus of the type used for polishing planar substrates, such as magnetic disks, between rotating plates. The apparatus includes, in a first main embodiment: (a) a support structure, (b) a lower polishing plate, rotatable about a first axis and defining a lower polishing plane, (c) an upper polishing plate, rotatable about a second axis and defining an upper polishing plane, and (d) means for rotating the plates independently of one another about the respective axes. The apparatus further includes: (e) adjustable support means interposed between the support structure and a gimbal carried on the upper plate, for supporting a selected portion of the weight of the upper plate along a support axis, when the upper and lower plates are in a polishing condition with one or more substrates disposed therebetween. The adjustable support means preferably includes an adjustable pressure cylinder and an elongate member connecting the support structure to the cylinder along the support axis.

Also provided are the following modifications, which provide the particular advantages of the present invention: (f) bracing means for preventing the second axis from shifting radially with respect to the first axis when the plates are rotated in a polishing operation, and (g) flexible coupling means in the adjustable support means, effective to allow the second axis to remain substantially coincident with the first axis when the plates are rotated, and these axes are offset from the support axis. According to one advantage of the apparatus, the bracing and coupling means are effective to maintain the planes of the two polishing plates in substantially parallel and coaxial alignment when the plates are rotated.

The bracing means preferably includes structures rigidly attached to the upper plate which are urged against a structural member whose radial position is constant with respect to the first axis. In preferred embodiments, this structural member is a central drive hub which is coaxial with the first axis, and the structures attached to the upper plate are cam followers.

The coupling means preferably includes a flexible rod alignment coupling interposed between the cylinder and the gimbal. This coupling preferably includes an upper section, capable of internal radial movement relative to the support axis, and a lower section, capable of internal angular movement relative to the support axis. Preferably, the range of this radial movement is less than about $\frac{1}{16}$ inch, and the range of angular movement is less than about 15°.

In a second main embodiment, the apparatus includes elements (b) through (f) as described above, in addition to (a) a support assembly, which is modified to include at least two independent supporting structures operably attached to a central support rod. The support structures are preferably air cylinders aligned substantially parallel to the support rod. The second embodiment optionally includes (g) flexible coupling means, as in the first embodiment.

These and other objects and features of the invention will become more fully apparent when the following detailed description of the invention is read in conjunction with the accompanying drawings.

BRIEF DESCRIPTION OF THE DRAWINGS

FIG. 5A shows overall flatness and FIG. 5B shows side-to-side uniformity.

DETAILED DESCRIPTION OF THE INVENTION

I. Polishing Apparatus for Planar Substrates

Figure 1:
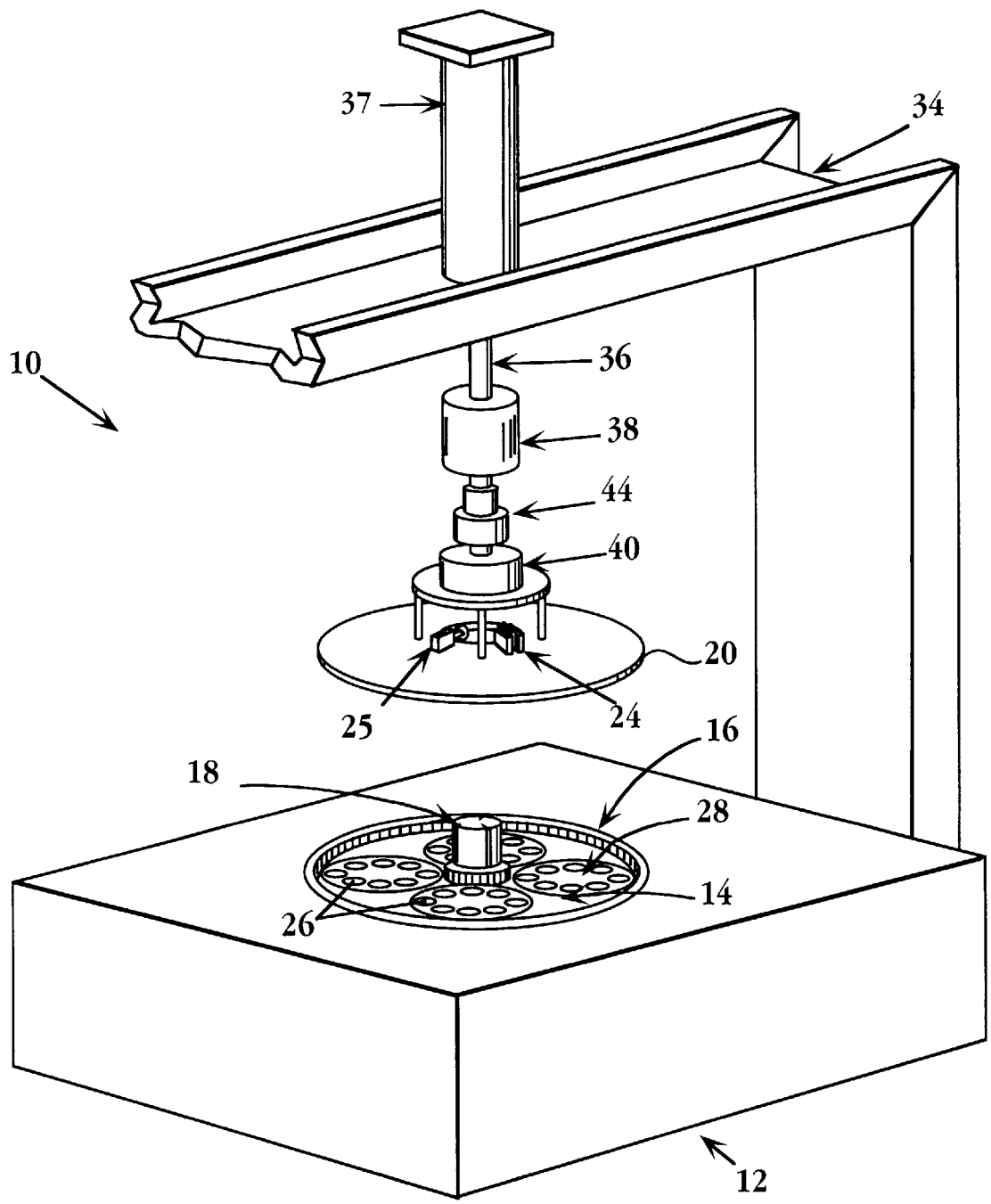
FIG. 1 shows a polishing apparatus in accordance with one embodiment of the invention.
Figure 2:
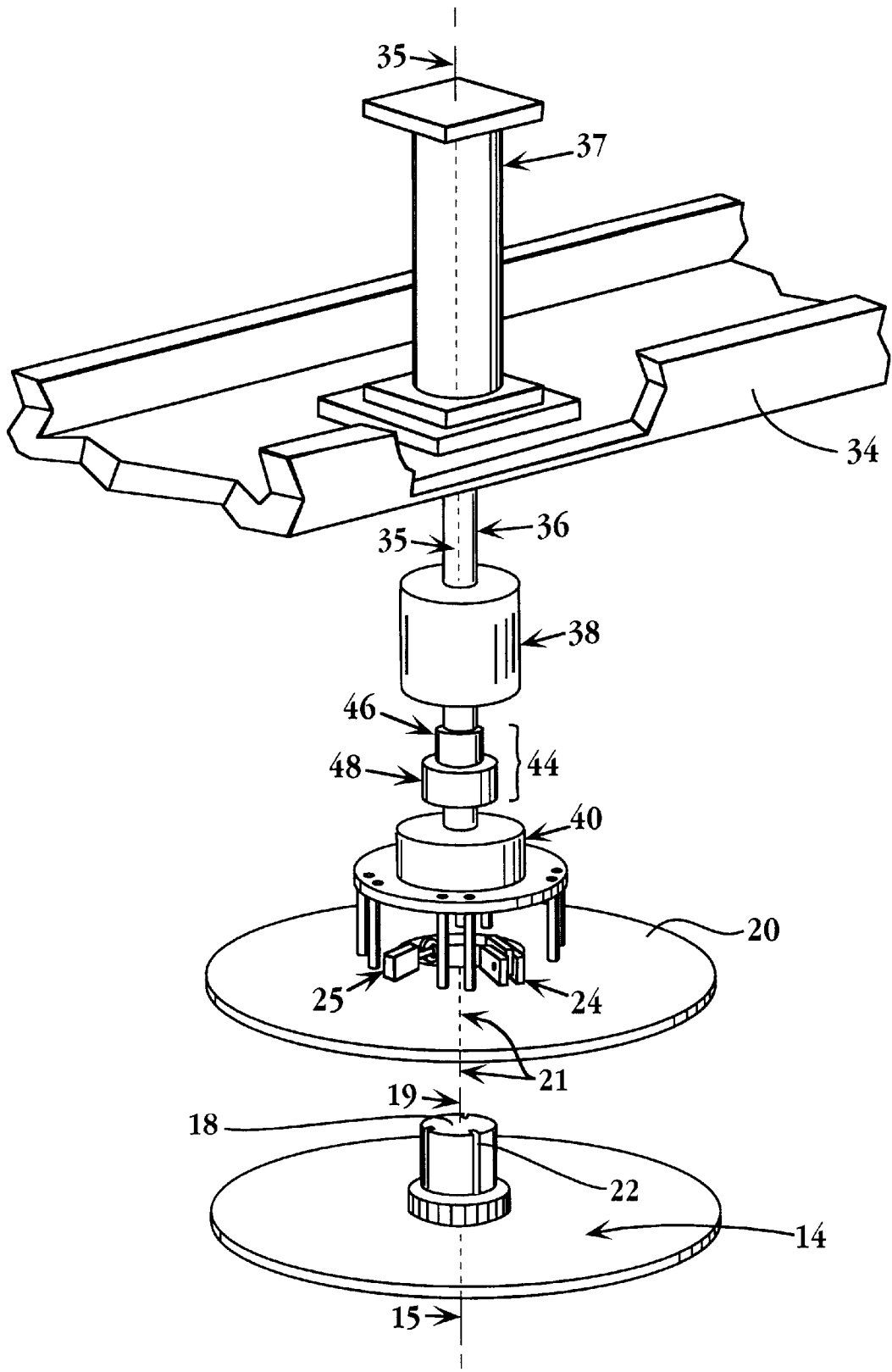
FIG. 2 shows a more detailed view of the plates and support structures of FIG. 1.

With reference to FIGS. 1 and 2, there is shown a polishing apparatus 10, in which disks or similar planar substrates are polished between upper and lower polishing plates. Such an apparatus includes a drive base 12 including conventional drive components. Supported on the lower base is a lower polishing plate 14, which is rotatable about a first axis 15 (shown in FIG. 2) and defines a lower polishing plane. The lower plate is driven by, e.g., a rotating ring gear as shown at 16 in FIG. 1.

In a typical design, a central drive hub 18 is situated within a central aperture in the lower polishing plate. This drive hub, which is able to rotate independently of the lower polishing plate, defines a drive axis 19 (shown in FIG. 2). The hub drives the rotation of an upper polishing plate, 20, around a second axis 21 (shown in FIG. 2), which is maintained substantially coincident with the drive axis and first axis 15. The upper polishing plate defines an upper polishing plane.

Figure 3:
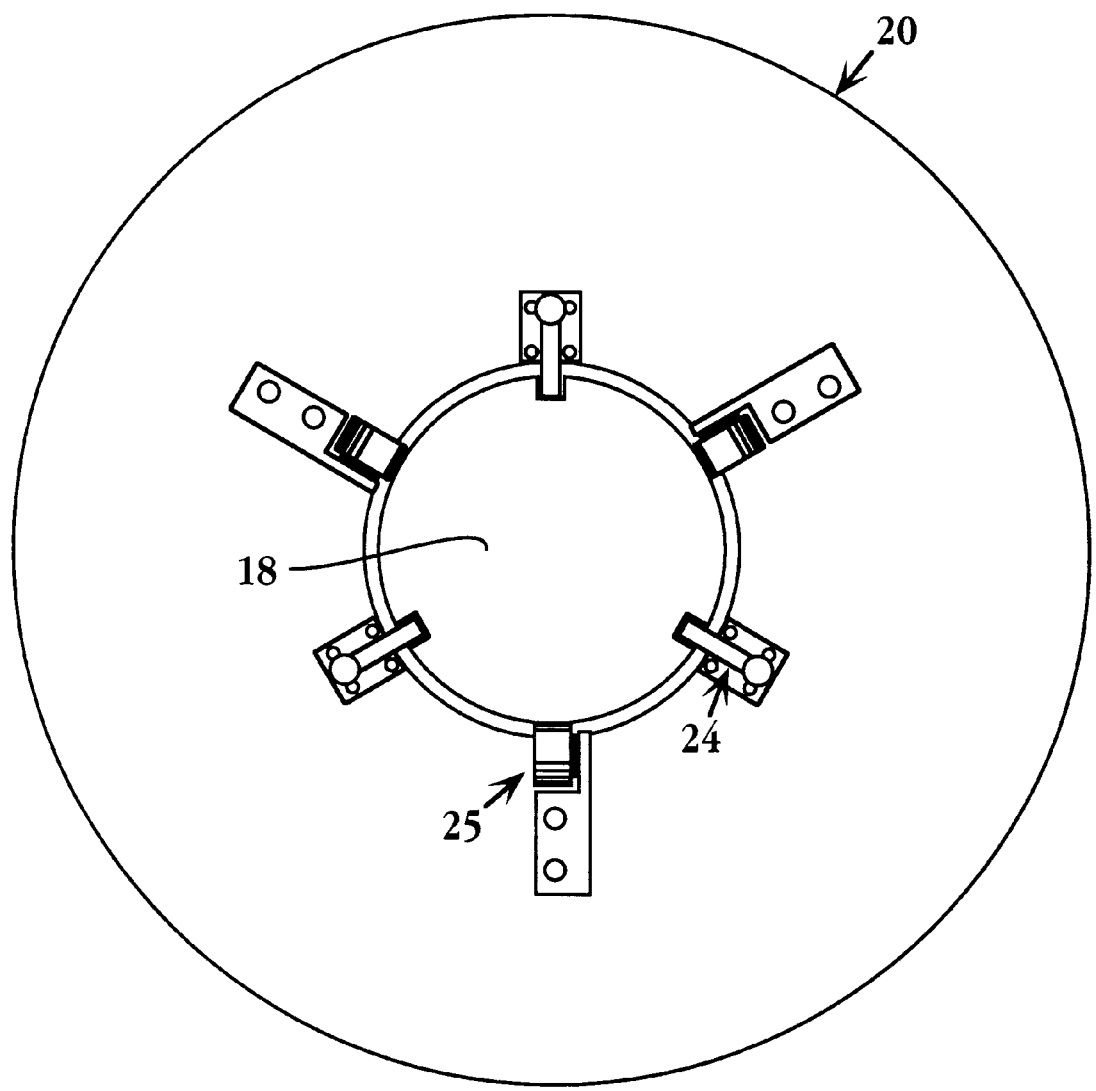
FIG. 3 shows a top view of the upper polishing plate, drive hub, drive latches and cam followers of FIGS. 1 and 2.

In order to engage the upper plate, hub 18 is provided with a plurality of slots 22 which engage drive latches, such as shown at 24, on the upper plate. Also shown are cam followers 25, which serve to more precisely engage drive hub 18, as discussed further below. For clarity, only one drive latch and one cam follower are shown in FIGS. 1 and 2. For operation of the device, a plurality of alternating drive latches and cam followers are provided on the upper plate. Preferably, three drive latches, spaced 120° apart, and three cam followers, spaced 120° apart, are provided, as shown in FIG. 3, a top view of the upper plate.

Substrates such as disks 26 are situated between the plates for polishing. In the embodiment shown, disks are contained within carriers 28, whose rotation is driven by ring gear 16. Although not shown in the figures, the facing surfaces of the plates are typically covered with porous rubber pads, and the upper plate is provided with apertures for introduction of, e.g., an abrading particle suspension or a wash fluid.

With continuing reference to FIGS. 1 and 2, the upper plate is suspended from an upper support structure or frame 34 (shown in partial view in the figures), along a support axis 35 (shown in FIG. 2), by an elongate member such as a support rod or strut 36. Upper air cylinder 37 is effective to raise and lower the upper plate and attached components. Interposed between the support frame and upper plate is an adjustable pressure cylinder 38. The pressure cylinder, also referred to herein as adjustable support means, serves to support a selected portion of the weight of the upper plate when the upper and lower plates are in a polishing condition, with one or more substrates disposed therebetween. The cylinder thus controls the total pressure applied by the upper plate to the substrate(s) and lower plate.

A gimbal, 40, carried on the upper plate for rotation therewith, connects the upper plate rotatably to the support structure. More particularly, the gimbal is rotatably coupled to the pressure cylinder attached to the support structure. The gimbal is constructed conventionally to allow the upper plate and gimbal housing to rotate relative to the stationary support rod and cylinder when the elongate axis of the rod is offset angularly, that is, in a non-perpendicular relation to the plane of the upper plate.

This embodiment also includes a rod alignment coupling 44, interposed between the cylinder and gimbal. As shown in FIG. 2, the coupling, also referred to herein as flexible coupling means, preferably includes an upper section 46, which is capable of internal radial movement with respect to the support axis, and a lower section 48, which is capable of internal angular movement with respect to the support axis. A typical coupling is shown in cross section in FIG. 4.

The modifications described herein are effective to maintain a substantially parallel and coaxial orientation, during a polishing operation, between the planes defined by the polishing plates. These modifications include, in one embodiment, eccentric adjustable cam followers, as shown at 25, and a flexible rod aligner coupling as shown at 44. The cam followers, also referred to herein as bracing means, impinge upon the outer surface of the hub 18 when it is engaged within the central aperture shown in upper plate 20. Such cam followers are commercially available in a variety of dimensions, e.g. under the CAMROL™ name from Bearings, Inc., headquartered in Germantown, Wis. The cam followers, or equivalent structures, are effective to prevent the second rotational axis from shifting radially with respect to the first rotational axis when the plates are rotated, as described further below.

Rod aligner coupling 44 is able to compensate for any radial offset, during operation, of the support axis defined by support rod 36 with respect to the rotational axes of the plates. Such couplings are commercially available in a variety of dimensions from Magnaloy Coupling Co., located in Alpena, Mich. As described below, the coupling is effective to allow the second axis to remain substantially coincident with the first axis if these axes become radially offset from the support axis.

Figure 6:
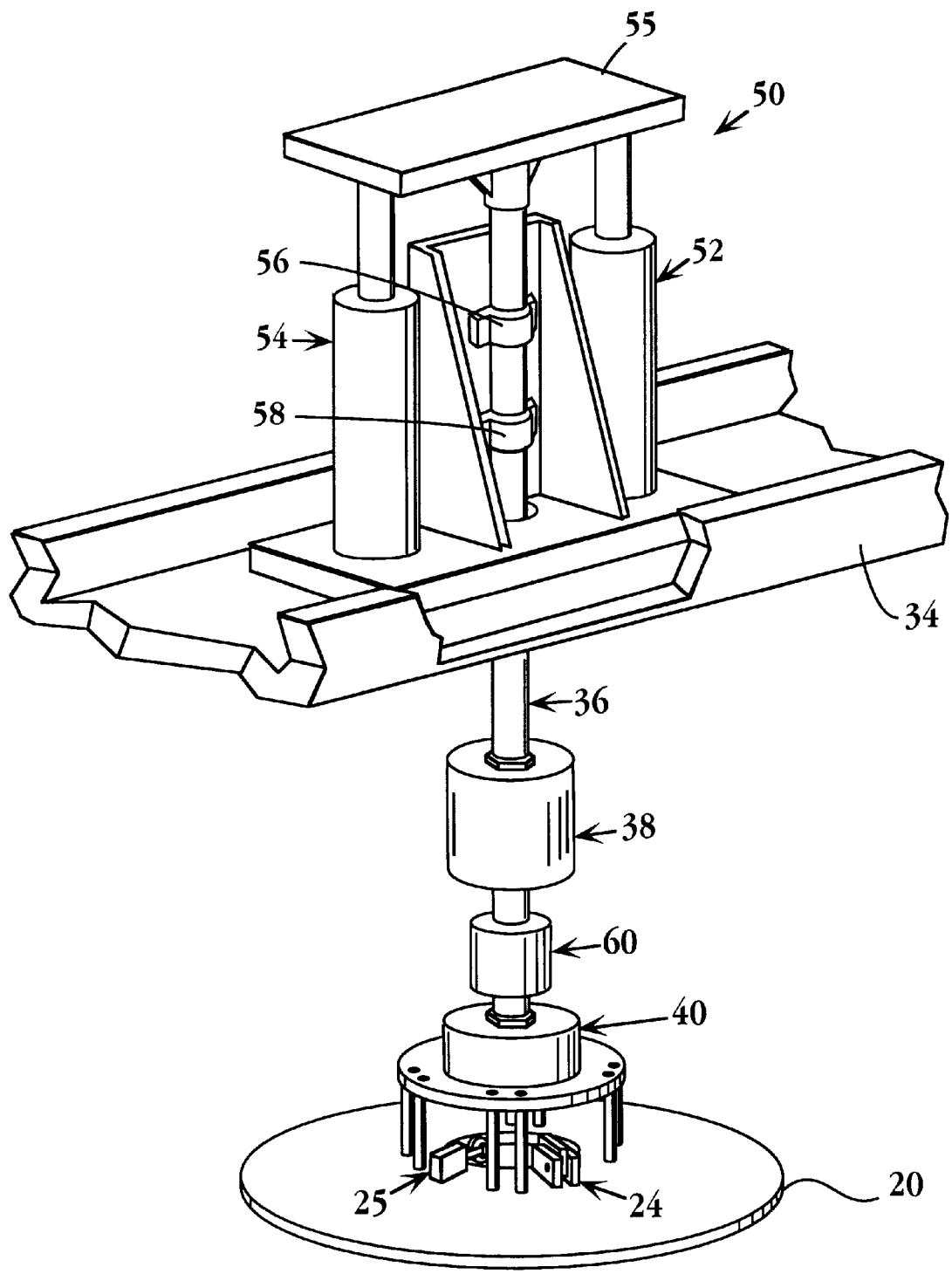
FIG. 6 shows an additional embodiment of the invention, having a multicylinder support assembly.

In a separate embodiment of the apparatus, shown in FIG. 6, a multicylinder support manifold 50, rather than single cylinder 37, is used to support the upper plate and attached components along support rod 36. More generally, the manifold includes at least two supporting structures, such as dual air cylinders 52 and 54 shown in FIG. 6, and an extension to support rod 36, which is operably attached to the support structure via e.g. crossbar 55. The use of multiple independently adjustable supports allows precise alignment of support rod 36, and thus support axis 35 (shown in FIG. 2) with the rotational axes of the polishing plates. Prior to a polishing operation, the support rod is aligned precisely with drive axis 19 (shown in FIG. 2) and locked in place. The support rod is further held in alignment by linear bearings 56 and 58.

Although a flexible rod coupling may be used with this embodiment of the apparatus, the support manifold has been found effective to set and maintain the alignment of support axis 35 with drive axis 19, such that flexible coupling 44 may be replaced with a solid coupling, as shown at 60.

II. Operation of the Polishing Apparatus

In a typical polishing operation, substrates to be polished, e.g. disks of various metals or other materials, are placed in carriers, such as shown at 28, provided on the upper face of the lower plate 14. The substrate carriers are engaged and thus rotated by outer ring gear 16.

Upper polishing plate 20 is lowered via upper air cylinder 37, or manifold 50, into a position proximal to the lower polishing plate/carrier assembly, whereupon the upper plate engages drive hub 18. Specifically, the drive latches 24 on the upper plate engages the slots 22 on the drive hub. It is understood that other equally effective engaging structures could be employed. The total downward pressure applied by the upper plate to the substrates and lower plate is controlled by adjustable pressure cylinder 38, which is effective to support a selected portion of the weight of upper plate 20 and associated components.

For optimum polishing, the upper and lower plates rotate in opposite directions, and the carriers are rotated independently. Relative rotation speeds may also be adjusted according to standards known in the art. In the apparatus shown, the plates, carriers, hub and gimbal rotate during operation, while the coupling and components above the coupling remain stationary.

The upper plate is generally provided with apertures for introduction of suspensions of abrading particles, e.g. aluminum oxide, or wash solutions. A typical polishing operation employs multiple stages of polishing with suspensions of different abrasiveness; for example, a suspension of 3 micron particles provides a first, coarse polishing, followed by a deionized water wash, a suspension of sub-micron particles to provide a fine polishing, and a further deionized water wash.

An inherent and persistent problem in the operation of existing polishing machines is maintenance of "focus", or parallel and coaxial alignment, between the upper and lower plates. In particular, any radial offset between support axis 35, and the axes of rotation 15 and 21 of the upper and lower plates, can result in uneven side-to-side forces across the upper plate, exerting an uneven load on the drive latches or other plate-driving mechanisms. Unless preventive means are applied, the upper plate shifts in response to the uneven load. The upper plate, thus offset radially and angularly from the lower plate, assumes an oscillating motion rather than simple rotation with respect to the lower plate, resulting in uneven side-to-side polishing.

According to the present modifications, eccentric adjustable cam followers 25, also referred to as bracing means, are provided to prevent the upper plate from shifting radially with respect to the lower plate. When upper plate 20 is lowered onto hub 18, the eccentric adjustable cam followers are set to precisely center the upper plate around the hub. The cam followers are preferably set to 0.005" clearance from the hub, such that the upper plate may shift by only about 0.003" or less, a negligible amount.

Although the cam followers maintain the upper and lower plates in a substantially constant parallel and coaxial orientation, a small amount of radial clearance, such as the 0.003" to 0.005" specified above, is set to allow minor compensatory movements of the upper plate, primarily in response to small variations in substrate thickness. Such movements have a negligible effect on the uniformity of the polished substrate.

The base components of the apparatus are assembled such that the hub and lower plate are concentric, and these components do not shift appreciably during operation; accordingly, drive axis 19 of the hub is substantially coincident with first axis 15 defined by the lower plate. By precisely aligning the upper plate with the hub, as described above, such that no significant radial shift occurs, second axis of rotation 21 of the upper plate is thereby maintained substantially coincident with the first axis of rotation of the lower plate.

It is understood that other drive mechanisms, rather than a centrally mounted hub, may be used to drive the upper plate, and other bracing means could be used to engage the upper plate in a constant radial alignment with the lower plate. In general, the bracing structures are joined with the upper plate and urged against a structural member, of which the central hub is one example, whose radial position is constant with respect to the rotational axis of the lower plate.

For example, cam followers mounted circumferentially on the upper plate could engage an external, perpendicular structure. Alternatively, the upper plate could be driven by pins which engage apertures within the lower plate or a parallel base structure, and cam followers could serve to maintain the pins in constant alignment within the apertures. Although other bracing structures, such as bearings, could conceivably be used, eccentric adjustable cam followers are the preferred structures.

As noted above, misalignment in existing machines of the kind described is commonly caused by deviation of the support axis with respect to the drive axis and/or the rotational axes of the polishing plates. In accordance with one embodiment the present invention, a further modification, exemplified by flexible rod aligner coupling 44, effectively isolates the support axis from the first and second rotational axes. During operation of the apparatus, if the support axis is radially misaligned from the rotational axes as it enters the coupling, radial compensation may be effected by upper section 46, and an associated angular compensation by lower section 48. The coupling thus allows the second axis to remain substantially coincident with the first axis when the plates are rotated, even when these axes are offset from the support axis, and prevents the uneven side-to-side forces described above.

During a polishing operation, the range of possible radial misalignment, and of compensating radial movement within the coupling, is preferably less than about $1/16$", and the range of compensating angular movement within the coupling is preferably less than about 15°.

Figure 4:
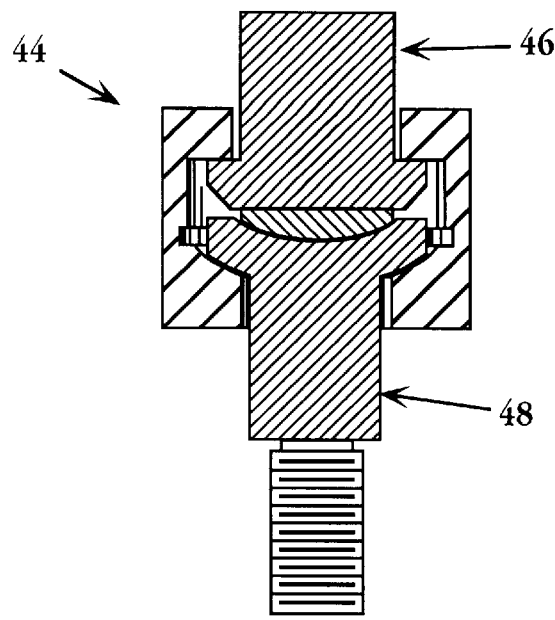
FIG. 4 is a cross sectional view of a flexible rod alignment coupling.
Figure 5A:
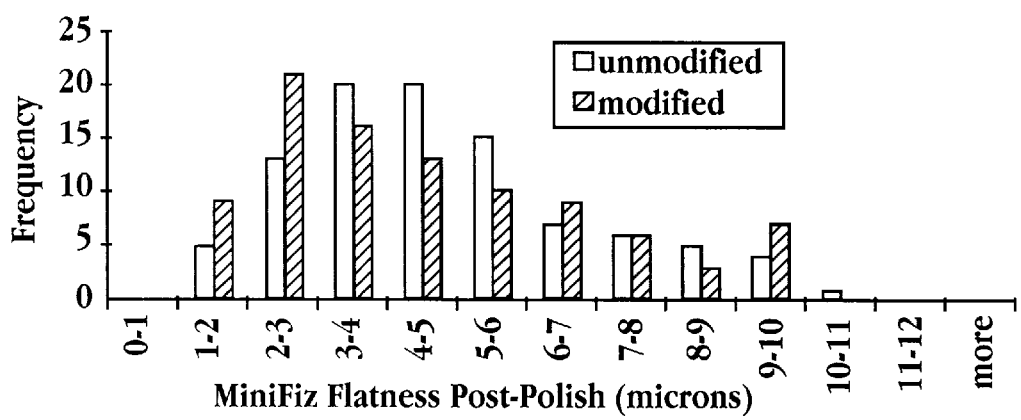
FIGS. 5A and 5B show comparative measurements of surface characteristics of polished disks with and without the improvements of the invention, where
Figure 5B:
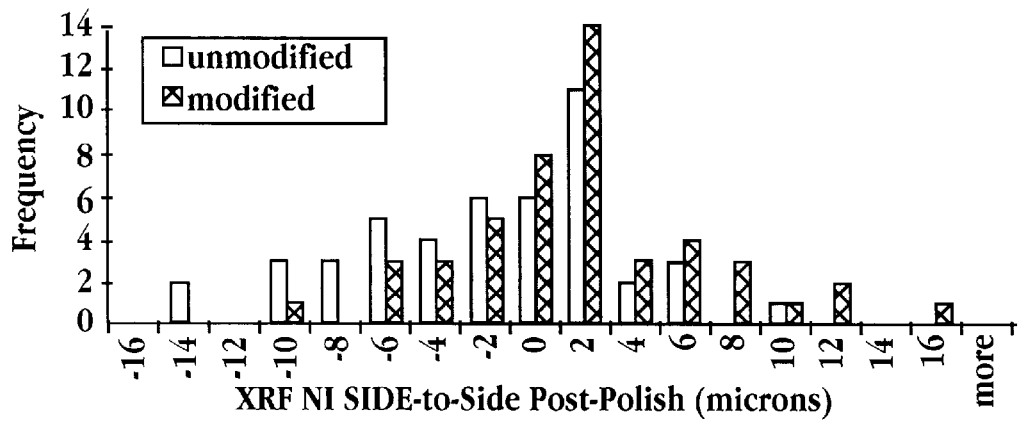

A preferred flexible coupling, as shown in FIG. 4, includes an upper section 46, which is capable of internal radial movement with respect to the support axis, and a lower section 48, which is capable of internal angular movement with respect to the support axis. Other coupling means include variations on the structure shown in FIG. 4; for example, separate structures could perform the radial compensation and the angular compensation described above with the same effective result. FIGS. 5A and 5B show flatness and side-to-side uniformity measurements on disks polished on machines with and without the above-described improvements, i.e., the bracing means (cam followers) and flexible coupler. FIG. 5A shows size and frequency of irregularities on polished disks, where higher frequencies of lower sizes are desirable. The graph shows that the modified machine produced disks with smaller irregularities overall than the standard machine. FIG. 5B shows side-to-side uniformity, where a value of zero indicates no difference between respective side-to-side locations on a disk, and thus a narrow distribution around zero is preferred. The machine having these modifications clearly produced a much narrower distribution, and thus more uniform side-to-side polishing, than the standard machine, due to less relative oscillation of the polishing plates.

In preliminary operations with the modified machines, increases in throughput of at least 8% were observed, due to less frequent unscheduled downtime for alignment of the machines. Thus, the modifications of the invention maintained the polishing planes in parallel alignment more consistently and for longer periods of time than the unmodified machines.

Machines modified in accordance with the embodiment shown in FIG. 6, having a multicylinder support manifold 50, a solid rod coupling 60, and eccentric cam followers, have also provided improved results with respect to unmodified machines. Flatness measurements, such as those shown in FIG. 5A for the FIG. 1 embodiment, gave a high frequency of values in the range of 0 to 3 microns, averaging 3.1 microns, with no values greater than 8 microns.

While the invention has been described with reference to specific methods and embodiments, it will be appreciated that various modifications may be made without departing from the invention.

It is claimed:

1. An apparatus for polishing a planar substrate between rotating plates, comprising
   (a) a support structure,
   (b) a lower polishing plate, rotatable about a first axis and defining a lower polishing plane,
   (c) an upper polishing plate, rotatable about a second axis and defining an upper polishing plane,
   (d) means for rotating said plates independently of one another about said axes,
   (e) adjustable support means interposed between said support structure and a gimbal carried on said upper plate, for supporting a selected portion of the weight of the upper plate along a support axis, when the upper and lower plates are in a polishing condition with one or more substrates disposed therebetween,
   (f) bracing means for preventing the second axis from shifting radially with respect to the first axis when the plates are rotated in a polishing operation, and
   (g) flexible coupling means in said adjustable support means, effective to allow the second axis to remain substantially coincident with the first axis when the plates are rotated, and these axes are offset from the support axis;
   whereby said bracing and coupling means are effective to maintain the planes of said plates in substantially parallel and coaxial alignment when the two plates are rotated.

2. An apparatus as in claim 1, wherein said adjustable support means includes an adjustable pressure cylinder and an elongate member connecting the support structure to the cylinder along the support axis.

3. An apparatus as in claim 1, wherein said bracing means comprises structures rigidly attached to said upper plate and urged against a structural member whose radial position is constant with respect to said first axis.

4. The apparatus of claim 3, wherein said structural member is a central drive hub which is coaxial with said first axis.

5. The apparatus of claim 4, wherein said structures are cam followers.

6. The apparatus of claim 1, wherein said coupling means includes a flexible rod alignment coupling interposed between said cylinder and said gimbal.

7. The apparatus of claim 6, wherein said coupling comprises an upper section, capable of internal radial movement relative to said support axis, and a lower section, capable of internal angular movement relative to said support axis.

8. The apparatus of claim 7, wherein said radial movement is less than about 1/16 inch, and said angular movement is less than about 15°.

9. An apparatus for polishing a planar substrate between rotating plates, comprising
   (a) a support assembly, comprising at least two independent supporting structures operably attached to a central support rod,
   (b) a lower polishing plate rotatable about a first axis and defining a lower polishing plane,
   (c) an upper polishing plate rotatable about a second axis and defining an upper polishing plane,
   (d) means for rotating said plates independently of one another about said axes,
   (e) adjustable support means interposed between said support assembly and a gimbal carried on said upper plate, for supporting a selected portion of the weight of the upper plate along a support axis, when the upper and lower plates are in a polishing condition with one or more substrates disposed therebetween, and
   (f) bracing means for preventing the second axis from shifting radially with respect to the first axis when the plates are rotated in a polishing operation.

10. An apparatus as in claim 9, wherein said support structures are air cylinders aligned substantially parallel to said support rod.

11. An apparatus as in claim 9, wherein said adjustable support means includes an adjustable pressure cylinder and an elongate member connecting said support rod to the cylinder along the support axis.

12. An apparatus as in claim 9, wherein said bracing means comprises structures rigidly attached to said upper plate and urged against a structural member whose radial position is constant with respect to said first axis.

13. The apparatus of claim 12, wherein said structural member is a central drive hub which is coaxial with said first axis.

14. The apparatus of claim 13, wherein said structures are cam followers.

* * * * *